US005993885A

United States Patent [19]

Lin et al.

[11] Patent Number: 5,993,885

[45] Date of Patent: Nov. 30, 1999

[54] STABILIZER SYSTEM FOR LIQUID NUTRITIONAL FORMULAS

[75] Inventors: Ershen Lin, New Milford, Conn.; Reinhard Behringer, Epalinges, Switzerland

[73] Assignee: Nestec S.A., Vevey, Switzerland

[21] Appl. No.: 09/083,672

[22] Filed: May 22, 1998

Related U.S. Application Data

[60] Provisional application No. 60/051,125, Jun. 27, 1997.

[51] Int. Cl.[6] .......................... A23C 17/00; A01N 37/18; A61K 38/00

[52] U.S. Cl. .......................... 426/583; 426/590; 426/654; 426/656; 426/801; 514/2

[58] Field of Search .................................... 426/590, 654, 426/656, 583, 801; 514/2

[56] References Cited

U.S. PATENT DOCUMENTS

| | | | |
|---|---|---|---|
| 4,497,800 | 2/1985 | Larson et al. | 514/2 |
| 5,472,952 | 12/1995 | Smidt et al. | 514/54 |
| 5,514,655 | 5/1996 | DeWille et al. | 514/21 |
| 5,514,656 | 5/1996 | Cope et al. | 514/21 |
| 5,550,106 | 8/1996 | Petschow et al. | 514/2 |
| 5,776,887 | 7/1998 | Wibert et al. | 514/2 |

*Primary Examiner*—Nina Bhat
*Attorney, Agent, or Firm*—Pennie & Edmonds LLP

[57] ABSTRACT

A stabilizer system for nutritional formulas; especially liquid nutritional formulas. The stabilizer system is made up of a gel-forming carrageenan and a diacetyl tartaric acid ester of mono- and di-glycerides. The nutritional formula is formed of a protein source, a lipid source, a carbohydrate source, and the stabilizer system. The nutritional formula has improved color and physical stability.

3 Claims, No Drawings

STABILIZER SYSTEM FOR LIQUID NUTRITIONAL FORMULAS

This application claims benefit under 35 U.S.C. §119(e) patent application 60/051,125 filed Jun. 27, 1997.

FIELD OF THE INVENTION

This invention relates to a stabilizer system for nutritional formulas; especially nutritional formulas containing a hydrolyzed protein source. The nutritional formulas are conveniently in liquid form and may be used as an infant formulas.

BACKGROUND OF THE INVENTION

Many nutritional formulas, such as infant formulas, are now provided in the form of ready-to-drink formulas or liquid concentrates to which the consumer adds a set amount of water to provide a ready-to-drink formula. These formulas are usually made up of a protein source, a carbohydrate source, a lipid source, various minerals and vitamins, and water. Emulsifiers and thickeners are usually added to stabilize the system.

These liquid nutritional formulas often need to be stored for periods of months. During this time, physical stability problems often arise. In particular the lipid components often separate from the aqueous components; despite the use of various emulsifiers and thickeners. While this phase separation may be rectified by simply shaking the formula, it is found that consumer acceptance of the product is greatly diminished. Also, the liquid nutritional formulas may take on a slight brown color which adversely affects consumer acceptability.

Further, nutritional formulas which are in powdered form are often reconstituted several hours or more prior to use. During this time, the lipid components may separate from the aqueous components; giving the reconstituted formula an unacceptable appearance.

Therefore there is a need for a stabilizer system which provides nutritional formulas with improved stability and improved color when in liquid form.

SUMMARY OF THE INVENTION

Accordingly, this invention provides a stabilizer system for a nutritional formula, the stabilizer system comprising a gel-forming carrageenan and a diacetyl tartaric acid ester of mono- and di-glycerides.

It is surprisingly found that a mixture of a gel-forming carrageenan and a diacetyl tartaric acid ester of mono- and di-glycerides provides an improved stabilizer system for nutritional formulas; especially liquid nutritional formulas. Further, it is found that the liquid nutritional formulas have improved color in that they are whiter and less brown. This is a significant advantage because consumer acceptability is greatly influenced by color.

In another aspect, this invention provides a nutritional formula, the nutritional formula including a protein source, a lipid source, a carbohydrate source, and a stabilizer system, the stabilizer system comprising a gel-forming carrageenan and a diacetyl tartaric acid ester of mono- and di-glycerides.

The nutritional formula is preferably a liquid nutritional formula in ready-to-consume or concentrated form.

Preferably the protein source is a hydrolyzed protein; for example hydrolyzed casein, hydrolyzed whey, hydrolyzed soy, or a mixture these hydrolyzed proteins.

In another aspect, this invention provides a method of stabilizing a liquid nutritional formula which includes a protein source, a lipid source, and a carbohydrate source, the method comprising incorporating a stabilizer system of a gel-forming carrageenan and a diacetyl tartaric acid ester of monoglycerides in the liquid nutritional formula.

In further aspect, this invention provides a method of increasing whiteness, decreasing browness, and stabilizing a liquid nutritional formula which includes a protein source, a lipid source, and a carbohydrate source, the method comprising adding a stabilizer system of a gel-forming carrageenan and a diacetyl tartaric acid ester of monoglycerides to the liquid nutritional formula.

DETAILED DESCRIPTION OF PREFERRED EMBODIMENTS

Embodiments of the invention are now described by way of example. The invention is based on the finding that a mixture of a gel-forming carrageenan and a diacetyl tartaric acid ester of mono- and di-glycerides provides an improved stabilizer system for nutritional formulas when in liquid form. The nutirional formulas may be provided in liquid form or may be provided in soluble powder form for reconstitution.

For ready-to-use liquid nutritional formulas, the diacetyl tartaric acid ester of mono- and di-glycerides preferably provides about 0.1% by weight to about 1.0% by weight of the liquid nutritional formula; for example about 0.2% to about 0.5% by weight. If the nutritional formula is provided in the form of a concentrate, these values may be increased by the degree of concentration. If the nutritional formula is provided in the form of a powder, the diacetyl tartaric acid ester of mono- and di-glycerides preferably provides about 0.6% by weight to about 6.0% by weight of the powder.

Suitable diacetyl tartaric acid esters of mono- and di-glycerides are commercially available; for example from Danisco Ingredients ISA, Inc of New Century, Kans., USA. For example, the diacetyl tartaric acid ester of mono- and di-glycerides commercialized under the name PANODAN® is particularly suitable. The diacetyl tartaric acid ester of mono- and di-glycerides preferably has a saponification value of 380 to 425, an acid value of 62 to 76, an iodine value of maximum 3, and a dropping point of about 45° C.

The gel-forming carrageenan suitably is K-carrageenan or carrageenan mixtures predominantly formed of K-carrageenan. Suitable gel-forming carrageenans are commercially available; for example from Shemberg USA of Searsport, Me., USA. A suitable gel-forming carrageenan is commercialized under the name BENLACTA® CM9425. For ready-to-use liquid nutritional formulas, the gel-forming carrageenan preferably provides about 0.001% by weight to about 0.02% by weight of the liquid nutritional formula; for example about 0.002% to about 0.01% by weight. If the liquid nutritional formula is provided in the form of a concentrate, these values may be increased by the degree of concentration. If the nutritional formula is provided in the form of a powder, the gel-forming carrageenan preferably provides about 0.006% by weight to about 0.12% by weight of the powder.

The protein source used may be any protein source suitable for use in nutritional formulas. Suitable protein sources are milk protein sources (for example casein, whey, non fat milk solids, and mixtures of these protein sources), and vegetable protein sources (for example, soy proteins, rice proteins, and the like). In fact, any suitable protein source may be used since the selection of the protein source is not critical. However, for infant formulas, organizations such as the Food and Agriculture Organization/World Health Organization have published the essential amino acid requirements for children of various age groups. Also, for infants under the age of about 2 years, an amino acid profile corresponding to that of human milk is generally regarded as desirable. Hence the protein source is suitably selected to meet these requirements. The protein source is suitably in the form of hydrolyzed protein. Hydrolyzed protein with a degree of hydrolysis of less than about 15% is preferred; for example about 10% or less. Especially preferred is hydrolyzed sweet whey which has a degree of hydrolysis of about 10% or less.

The amount of protein used is conveniently such that the protein comprises about 1.0% to about 2.5% by weight of the nutritional formula when in ready-to-use liquid form; for example about 1.5% by weight to about 2.0% by weight. If the liquid nutritional formula is provided in the form of a concentrate, these values may be increased by the degree of concentration. If the nutritional formula is provided in the form of a powder, the protein preferably comprises about 6.0% to about 15% by weight of the powder.

The lipid source may be any suitable lipid or lipid mixture. Vegetable fats are particularly suitable; for example soy oil, palm olein, corn oil, olive oil, sunflower oil, coconut fats, high-oleic safflower oil, and the like. Mixtures of these oils may also be used. A lipid mixture which contains monounsaturated fatty acids and essential polyunsaturated fatty acids is preferred.

The amount of lipid used is conveniently such that the lipid comprises about 2.5% to about 4.5% by weight of the nutritional formula when in ready-to-use liquid form; for example about 3% to about 4.0% by weight. If the liquid nutritional formula is provided in the form of a concentrate, these values may be increased by the degree of concentration. If the nutritional formula is provided in the form of a powder, the lipid preferably comprises about 15% to about 30% by weight of the powder.

The carbohydrate source may be any suitable carbohydrate or carbohydrate mixture. For example, the carbohydrates may be maltodextrin, corn starch, modified starch, maltose, or sucrose, or mixtures thereof.

The amount of carbohydrate used is conveniently such that the carbohydrate comprises about 5% to about 10% by weight of the nutritional formula when in ready-to-use liquid form; for example about 6% to about 8% by weight. If the liquid nutritional formula is provided in the form of a concentrate, these values may be increased by the degree of concentration. If the nutritional formula is provided in the form of a powder, the carbohydrate preferably comprises about 30% to about 60% by weight of the powder.

The nutritional formula may also contain vitamins and minerals to meet appropriate requirements.

The nutritional formula may be produced by any suitable procedure. For example, the nutritional formula may be produced by preparing an oil phase of the lipid source and the diacetyl tartaric acid ester of mono- and di-glycerides. The diacetyl tartaric acid esters of mono- and di-glycerides is suitably dissolved in the lipid source at a raised temperature of about 65° C. to about 80° C. The oil phase is then mixed into an aqueous phase made up of water, the protein source, the carbohydrate source, a gel-forming carrageenan and minerals. The resulting emulsion preferably has a solid content of about 15 to about 16% by weight at this stage.

If desired, the emulsion may be rapidly heated, for example to a temperature of about 55° C. to about 100° C. This may be carried out in a plate heat exchanger or similar heating means; for example a steam injector. Preferably, the mixture is held at the temperature for about 10 seconds to about 20 seconds; for example about 15 seconds. Preheating the mixture in this manner improves the long term physical stability of the product.

If necessary, the preheated emulsion may then be cooled; for example by flash cooling. The emulsion is then homogenized. This may be carried out in a conventional manner; for example in two passes through a homogenizer at 25 MPa and 5 MPa respectively. The homogenized mixture is then preferably cooled to a temperature of about 5° C. to about 25° C. This may be carried out in a plate heat exchanger or similar cooling means.

If not added earlier, the vitamins and any further minerals may be added at this point. Also if necessary, the solids content of the cooled emulsion may be adjusted. If the formula is not ultimately subjected to retorting, sterilization may be carried out at this point. For example, the emulsion may be rapidly heated, for example to a temperature of about 130° C. to about 160° C. This may be carried out in a plate heat exchanger or similar heating means, or combination of heating means; for example plate heat exchanger and a steam injector. Preferably, the mixture is held at the temperature for about 2 seconds to about 10 seconds; for example about 5 seconds.

If the mixture has been sterilized, it may then be cooled; for example by flash cooling to about 75° C. to about 85° C. The cooled mixture is then homogenized. This may be carried out in a conventional manner; for example in two passes through a homogenizer at 25 MPa and 5 MPa respectively. The homogenized mixture is then preferably cooled to a temperature of about 5° C. to about 25° C. This may be carried out in a plate heat exchanger or similar cooling means.

Any vitamins not added earlier may be added at this point. If necessary, the solids content and pH of the cooled mixture may adjusted.

For nutritional formulas in liquid form, the cooled mixture is then filled into containers. This may be done aseptically or may be done conventionally and the subjected to retorting; for example at about 115° C. to about 125° for about 10 to about 15 minutes. For nutritional formulas in powder form, the cooled mixture may be dried to powder; for example by spray drying.

The nutritional formulas, when in liquid form, are found to have improved stability over formulas which contain other stabilizer systems. Further, for liquid nutritional formulas, the formulas have less brown color when measured prior to shaking. This is important since the first impression that a consumer has of liquid nutritional formulas is usually after a long period of storage.

EXAMPLE 1

Hydrolyzed sweet whey, maltodextrin, lactose, a gel-forming carrageenan (BENLACTA® CM-9425, Shemberg USA Corp.), and minerals are dissolved in water and heated to about 75° C. An oil phase of diacetyl tartaric acid ester of mono- and di-glycerides (PANODAN® FDP K, Danisco Ingredients USA Inc) in a mixture of palm olein, soy oil, coconut oil and high oleic sunflower oil is prepared at a temperature of about 75° C. The oil phase is added to the aqueous phase under stirring at about 5000 rpm for 5 minutes.

The resultant emulsion is heated to 70° C. and vitamins are added. The emulsion is then homogenized in two passes through a homogenizer at 15 MPa. The homogenized emulsion is cooled to a temperature of about 25° C. Citric acid is then added to adjust the pH to 6.8. The mixture is then filled into containers and subjected to retorting at about 118° C. for about 13 minutes.

The resultant formula has a good, white color with little brown tints.

EXAMPLE 2

A ready-to-drink infant formula is prepared by dissolving diacetyl tartaric acid ester of mono- and di-glycerides (PANODAN® FDP K, Danisco Ingredients USA Inc) in a mixture of palm olein, soy oil, coconut oil and high oleic sunflower oil at about 74° C. Separately hydrolyzed protein, maltodextrin, a gel-forming carrageenan (BENLACTA(® CM-9425, Shemberg USA Corp.), and minerals are dissolved in water at about 71° C. The oil mixture is then mixed into the water mixture. The resulting emulsion has a solid content of about 15 to about 16% by weight.

The emulsion is rapidly preheated to a temperature of about 78° C. in a plate heat exchanger and held at the temperature for about 15 seconds. The preheated emulsion is flashed and then homogenized in two passes through a homogenizer at 25 MPa and 5 MPa respectively. The homogenized emulsion is cooled to a temperature of about 7° C. in a plate heat exchanger. Vitamins and further minerals are added and the solids content of the cooled emulsion adjusted to 12.5%.

The emulsion is rapidly heated to a temperature of about 148° C. in a plate heat exchanger followed by a steam injector. The emulsion mixture is held at the temperature for about 5 seconds. The mixture flash cooled to about 80° C. and then homogenized in two passes through a homogenizer at 25 MPa and 5 MPa respectively. The homogenized mixture is then cooled to a temperature of about 7° C. in a plate heat exchanger.

Further vitamins are added at this point and the solids content adjusted to 12.5% and pH adjusted to 7.1. The cooled mixture is then filled into containers and subjected to retorting at about 118° C. for about 13 minutes.

The infant formula contains the following components:

| Component | Amount (% by weight) |
|---|---|
| Protein | 1.65 |
| Lipid | 3.5 |
| Carbohydrate | 7.01 |
| Diacetyl tartaric acid ester of mono- and di-glycerides | 0.37 |
| Carrageenan | 0.003 |

The infant formula has 12.5% by weight of total solids. The energy density is about 680 kcal/l.

EXAMPLE 3

Two liquid nutritional formulas are prepared. One formula (Sample 1) is as described in Example 2. The other formula (Control) is produced in the same way with the same ingredients except that a stabilizer system of monoglycerides and soy lecithin is used in place of diacetyl tartaric acid ester of mono- and di-glycerides and carrageenan.

The following characteristics of the two formulas are determined immediately after production, after 30 days of storage and 60 days of storage: (i) browness; (ii) whiteness, (iii) volume percentage of cream layer to total volume; (iv) volume percentage of aqueous layer to total volume; (v) the size distribution of particles, (vi) the presence of coalescence and flocculation, and (vii) pH. The results are as follows:

| Characteristic | Sample 1 | Control |
|---|---|---|
| Browness | | |
| Day 1 | 3.0 | 3.3 |
| 30 days | 3.1 | 3.6 |
| 60 days | 3.4 | 4.5 |
| Color (WD) | | |
| Day 1 | 73.7 | 72.2 |
| 30 days | 73.6 | 71.7 |
| 60 days | 73.5 | 71.2 |
| Cream Volume Percentage | | |
| Day 1 | 0 | 0 |
| 30 days | 5.0 | 8.3 |
| 60 days | 8.3 | 9.2 |
| Aqueous Volume Percentage | | |
| Day 1 | 0 | 0 |
| 30 days | 0.8 | 6.7 |
| 60 days | 8.3 | 9.2 |
| Mean particle diameter (μm) | | |
| Day 1 | 0.48 | 0.83 |
| 30 days | 0.51 | 1.32 |
| 60 days | 0.48 | 0.82 |
| Coalescence | | |
| Day 1 | 1.0 | 2.0 |
| 30 days | 1.5 | 2.0 |
| 60 days | 1.0 | 2.0 |
| Flocculation | | |
| Day 1 | 2.0 | 2.0 |
| 30 days | 1.0 | 2.0 |
| 60 days | 1.0 | 2.0 |
| pH | | |
| Day 1 | 6.43 | 6.79 |
| 30 days | 6.45 | 6.79 |
| 60 days | 6.29 | 6.77 |

Browness is expressed using a scale from 0 to 9 where 0 indicates no brown color and 9 indicates completely brown. Browness is measured prior to shaking.

The color is expressed as whiteness degree (WD) where $WD=100-((100-L)^2+(a^2+b^2))^{0.5}]$ and where L, a, and b are as defined in DIN 6174. Pure white has a whiteness degree of 100 and is based on a DIN 5033 reference. A BYK-Gardner Color-View™ spectrophotometer is used.

Coalescence and flocculation are expressed on a scale of 1 to 8 and 1 to 10 respectively. In each case, 1 indicates no noticeable coalescence or flocculation. For coalescence, 8 indicates significant coalescence with particles of size of 10 μm. For flocculation, 10 indicates significant flocculation with particles of size of significantly larger than 10 μm.

The control sample has a browner color and the browness increases with time at a faster rate. Also, Sample 1 has a slightly whiter color. The control sample is also more subject to phase separation. Further the control sample has larger particles and is subject a to higher coalescence score.

We claim:

1. A stabilized liquid infant formula, the infant formula comprising:

a protein source consisting essentially of hydrolyzed whey protein which has a degree of hydrolysis of 10 or less, a lipid source, a carbohydrate source, and a stabilizer system, the stabilizer system comprising about 0.001% to about 0.02% by weight of a gel-forming carrageenan and about 0.2% to about 0.5% by weight of a diacetyl tartaric acid ester of mono- and di-glycerides, the percentages being on the basis of the liquid nutritional formula.

2. An infant formula according to claim 1 in which the whey protein is sweet whey protein.

3. An infant formula according to claim 1 in which the gel-forming carrageenan provides about 0.002% to about 0.02% by weight of the liquid nutritional formula.

* * * * *